Patented Apr. 19, 1949

2,467,903

UNITED STATES PATENT OFFICE 2,467,903

METHOD OF PURIFYING AND CONCENTRATING SESAMIN EXTRACTS

Allen L. Omohundro, Wilton, and Emil C. Fanto, Fairfield, Conn., and Irving Reich, Brooklyn, N. Y., assignors to McKesson & Robbins, Incorporated, Bridgeport, Conn., a corporation of Maryland No Drawing. Application July 20, 1945, Serial No. 606,280

6 Claims. (Cl. 260—345)

The present application is a continuation-in-part of copending application Serial No. 550,308, filed August 19, 1944, and relates to a method of purifying and concentrating a sesamin extract.

Sesamin is a compound which is believed to have a common nucleus composed of two fused dihydrofuran rings with a substituted pyrocatechin group attached symmetrically to one of the carbon atoms adjacent to each of the ether oxygen atoms. The formula for sesamin is believed to be as follows, R and R' representing $O_2CH_2$ (methylendioxyl):

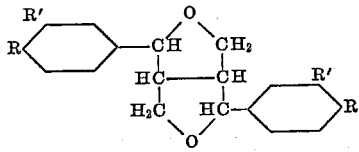

Sesamin has the synergistic effect of enhancing the activity of pyrethrins in insecticides. One effective method of extracting sesamin from sesamin-bearing substances, such as sesame oil and sesame seed, is described in the aforesaid copending application Serial No. 550,308. In accordance with this method, a commercially available sesamin-bearing substance is extracted with an alcohol or acetone. The extracting agent may be methyl alcohol, ethyl alcohol, isopropyl alcohol, n-propyl alcohol and acetone. The most satisfactory extracting solvent has been found to be methyl alcohol.

The method of extraction disclosed in the copending application may be carried out by stirring one volume of sesamin-bearing oil with two volumes of methyl alcohol at 60°–65° C. The resulting mixture separates into two layers. The upper layer contains methyl alcohol having in solution about 50 to 70% of the sesamin originally contained in the oil. This upper methyl alcohol layer is drawn off at approximately the temperature indicated, and the methyl alcohol is distilled off, leaving a residue concentrate or extract which contains 40 to 80° sesamin, depending on the sesamin contents of the original oil.

One object of the present invention is to provide a new and improved process by which a sesamin extract, such as that obtained from the method above described, is further purified and concentrated.

Another object is to provide a new and improved insecticide mixture of pyrethrin and sesamin having improved insecticidal activity.

In accordance with the feature of the present invention, the sesamin extract, as obtained for example from the process described in the copending application, is further purified and concentrated by treatment with a low boiling petroleum fraction. The petroleum distillate or cut used is desirably petroleum ether having a boiling range of 50°–70° C. Although petroleum ether is highly desirable for the purpose, it has been found that in general, petroleum distillates of a specific gravity of about .800 at 20° C. are also suitable. In particular, naphtha, lighter kerosene fractions and those petroleum fractions in the hexane and heptane range can be used.

The sesamin concentrate, which is extracted from the sesamin oil by methyl alcohol, and which has its solvent alcohol substantially removed, is partly liquid and oily. It has been found that the solid portion of this concentrate is mostly sesamin, and is practically insoluble in petroleum distillate, such as the petroleum ether described. The oily liquid portion of the concentrate contains much less sesamin, and is soluble in petroleum ether, so that the treatment with petroleum ether affords an effective method of separating and concentrating the solid material from the oily material. After the sesamin concentrate has been treated with the petroleum distillate as described, the undissolved solid material is dried, and can be used in conjunction with pyrethrin to form a highly effective insecticide.

As a specific example of the process of the present invention, 100 pounds of sesamin concentrate made by extraction with methyl alcohol as described in the copending application, after being substantially freed from the alcohol solvent, is mixed thoroughly with 90 gallons of petroleum ether in a closed vessel equipped with a stirrer. After these substances have been thoroughly mixed through operation of the stirrer, the mixture is permitted to stand, so that the insoluble solid material settles out. The mixture is then filtered through a filtering system containing plates or chambers, where the solid material insoluble in petroleum ether is collected and washed with petroleum ether. The solid material is then dried.

By means of the specific process described, 100 pounds of concentrate of a specific rotation of +31° when treated with petroleum ether, will yield 26 pounds of dry solid residue and 74 pounds of ether soluble material. The solid residue was found to have a specific rotation of +92°, while the specific rotation of the ether soluble material was only +3.2°. The optical activities of these substances were tested with sodium light at 20° C. It is seen from the relative magnitude in the optical activities of the substances, that all of the active synergistic sesamin is concentrated in the solid residue.

Besides its improved synergistic activity, the solid residue obtained by the process of the present invention represents a very desirable, economical form of sesamin for handling, shipping, storing, exporting and using with powders in powder sprayers.

To determine the relative insecticidal properties of the separated solid sesamin, the oily layer and the original sesamin concentrate, separate samples of each of these were made up in combination with 60 milligrams of pyrethrins. A control of 60 milligrams alone was used as a check. Sesamin has no insect toxicity by itself, so it must be combined with pyrethrin in order that it may exert its synergistic action.

Since the solid sesamin was shown to be much more active than the oily layer or the original concentrate, 10 milligrams of this solid sesamin plus 60 milligrams of pyrethrins per 100 cc. of solution was tested against flies by the Peet-Grady method, and the percentage kill determined. The oily layer contained much less sesamin, so that 250 milligrams of this layer plus 60 milligrams of pyrethrins per 100 cc. of solution was tested on flies, and the percent kill determined. Similarly, 50 milligrams of the original concentrate plus 60 milligrams of pyrethrin per 100 cc. of solution was tested. Also, just 60 milligrams of pyrethrin per 100 cc. of solution alone was tested for fly mortality, as a control. The result of these tests is indicated in the following chart:

|  | Specific Rotation in 100 mm. Tube | Each 100 cc. of solution contains— | | |
|---|---|---|---|---|
|  |  | Mgs. of Sesamin | Mgs. of Pyrethrins | Percent Fly Mortality |
|  | *Degrees* |  |  |  |
| Wt. of original Sesamin Concentrate, 10.000 grams | +31 | 50 | 60 | 62 |
| Wt. of liquid fraction soluble in Petroleum ether, after removal of the Petroleum ether. This is the "oily layer" or fraction, 7.426 grams or 74.26% | +3.2 | 250 | 60 | 67 |
| Wt. of solid material (mostly Sesamin) which is not soluble in Petroleum ether, 2.603 grams or 26.03% | +92.8 | 10 | 60 | 64 |
| Pyrethrum control |  | 00 | 60 | 26 |

It should be noted from this chart that 250 milligrams of the oily layer is the amount required to produce approximately the same insecticidal effect as 50 milligrams of the original sesamin concentrate or 10 milligrams of the sesamin solid powder when added to the pyrethrum control containing 60 milligrams of pyrethrin.

While the invention has been described with particular reference to a specific embodiment, it is to be understood that it is not to be limited thereto but is to be construed broadly and restricted solely by the scope of the appended claims.

We claim:

1. A method of obtaining a concentrated sesamin containing product, which comprises treating an oil-bearing sesamin-containing substance with a solvent of the class consisting of acetone, methanol, ethyl alcohol and propyl alcohol, forming a separable layer having a relatively high concentrate of sesamin, separating said layer, removing the solvent from said layer, treating the residue with a low boiling petroleum distillate, and removing the undissolved sesamin containing product.

2. A method of obtaining a concentrated sesamin containing product, which comprises mixing and agitating sesamin bearing oil with acetone, forming a separable layer having a relatively high sesamin concentration, separating said layer from the mixture, removing the acetone from the layer, mixing the residue with a low boiling petroleum distillate, and removing the undissolved sesamin-containing residual product.

3. A method of obtaining a concentrated sesamin containing product, which comprises mixing and agitating sesamin bearing oil with methanol, forming a separable layer having a relatively high sesamin concentration, separating said layer from the mixture, removing the methanol from the layer, mixing the residue with a low boiling petroleum distillate, and removing the undissolved sesamin-containing residual product.

4. A method of obtaining a concentrated sesamin containing product, which comprises mixing and agitating sesamin bearing oil with ethyl alcohol, forming a separable layer having a relatively high sesamin concentration, separating said layer from the mixture, removing the ethyl alcohol from the layer, mixing the residue with a low boiling petroleum distillate, and removing the undissolved sesamin-containing residual product.

5. The method of claim 3 in which sesamin bearing oil and solvent are employed in the proportions of approximately one to two by volume.

6. The method of claim 3 in which the solvent residue and petroleum distillate are mixed in the proportions of approximately 100 pounds of residue and ninety gallons of petroleum distillate.

ALLEN L. OMOHUNDRO.
EMIL C. FANTO.
IRVING REICH.

REFERENCES CITED

The following references are of record in the file of this patent:

Heller et al., Jr. of Economic Entomology, vol. 35, 1942, pgs. 247–248.

Bertram et al., Chemical Abstracts, vol. 23 (1929), page 391.

Heilbron, "Dictionary of Organic Compounds," 1938, vol. III, pgs. 626 and 627.

"Pharmacology," 1941, p. 1518, Bruce et al.

Chem. Ab., vol. 35, page 1518 of 1941.

Chem. Abstracts, vol. 24, page 2000, 1930.